(12) United States Patent
Oki et al.

(10) Patent No.: US 6,464,143 B2
(45) Date of Patent: *Oct. 15, 2002

(54) CARD READER AND ELECTRONIC DEVICE

(75) Inventors: Hajime Oki, Hyogo; Yasuhiro Kanayama, Osaka, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,483

(22) Filed: Nov. 5, 1999

(65) Prior Publication Data

US 2002/0079373 A1 Jun. 27, 2002

(30) Foreign Application Priority Data

Nov. 6, 1998 (JP) ............................................. 10-315870

(51) Int. Cl.$^7$ ................................................ G06K 13/00
(52) U.S. Cl. ...................... 235/475; 235/449; 235/482; 235/380
(58) Field of Search ................................. 235/475, 380, 235/441, 451, 477, 478, 485

(56) References Cited

U.S. PATENT DOCUMENTS

| | | | | |
|---|---|---|---|---|
| 3,573,434 A | * | 4/1971 | Wallace .................... 235/61.11 |
| 3,721,807 A | * | 3/1973 | Miller et al. ............. 235/61.6 E |
| 3,836,753 A | * | 9/1974 | Pass ..................... 235/61.11 D |
| 3,943,335 A | * | 3/1976 | Kinker et al. ............... 235/61.7 |
| 4,322,613 A | * | 3/1982 | Oldenkamp ................. 235/449 |
| 4,810,863 A | * | 3/1989 | Kachi et al. ................. 235/441 |
| 5,036,184 A | * | 7/1991 | Sasaki ......................... 235/479 |
| 5,079,413 A | * | 1/1992 | Sasaki ......................... 235/479 |
| 5,646,392 A | * | 7/1997 | Oguchi ....................... 235/475 |
| 5,726,432 A | * | 3/1998 | Reichardt ................... 235/441 |
| 5,912,446 A | * | 6/1999 | Wong et al. ................. 235/449 |
| 6,000,607 A | * | 12/1999 | Ohki et al. ................. 235/379 |
| 6,021,948 A | * | 2/2000 | Tsai et al. .................... 235/486 |
| 6,036,097 A | * | 3/2000 | Harsock et al. ............... 235/46 |
| 6,196,463 B1 | * | 3/2001 | Ferry ........................... 235/475 |
| 6,199,754 B1 | * | 3/2001 | Epstein ...................... 235/379 |
| 6,250,552 B1 | * | 6/2001 | Hirasawa .................... 235/475 |
| 6,149,064 A1 | * | 11/2001 | Yamaoka et al. ........... 235/479 |

FOREIGN PATENT DOCUMENTS

| | | | |
|---|---|---|---|
| JP | 8-315088 | | 11/1996 |
| JP | 10-63801 | | 3/1998 |
| JP | 02001109849 A | * | 4/2001 |

* cited by examiner

*Primary Examiner*—Michael G. Lee
*Assistant Examiner*—Daniel Walsh
(74) *Attorney, Agent, or Firm*—Wenderoth, Lind & Ponack, L.L.P.

(57) ABSTRACT

A card reader including a card guide path for guiding a card into the device, a card holding configuration for holding the card at a prescribed position in the device, a card position retaining configuration for retaining the position of the card held by the card holding configuration even if an external force is applied, and a driving configuration for generating power for ejecting the card, in which the driving configuration generates driving force for ejecting the card by a card eject command signal.

14 Claims, 9 Drawing Sheets

State A

State B

State C

State D

Prior Art

CARD READER AND ELECTRONIC DEVICE

FIELD OF THE INVENTION

The present invention relates to a card reader and an electronic device for handling a card having magnetic stripes or an IC chip for reading and writing information.

BACKGROUND OF THE INVENTION

Figure 9:
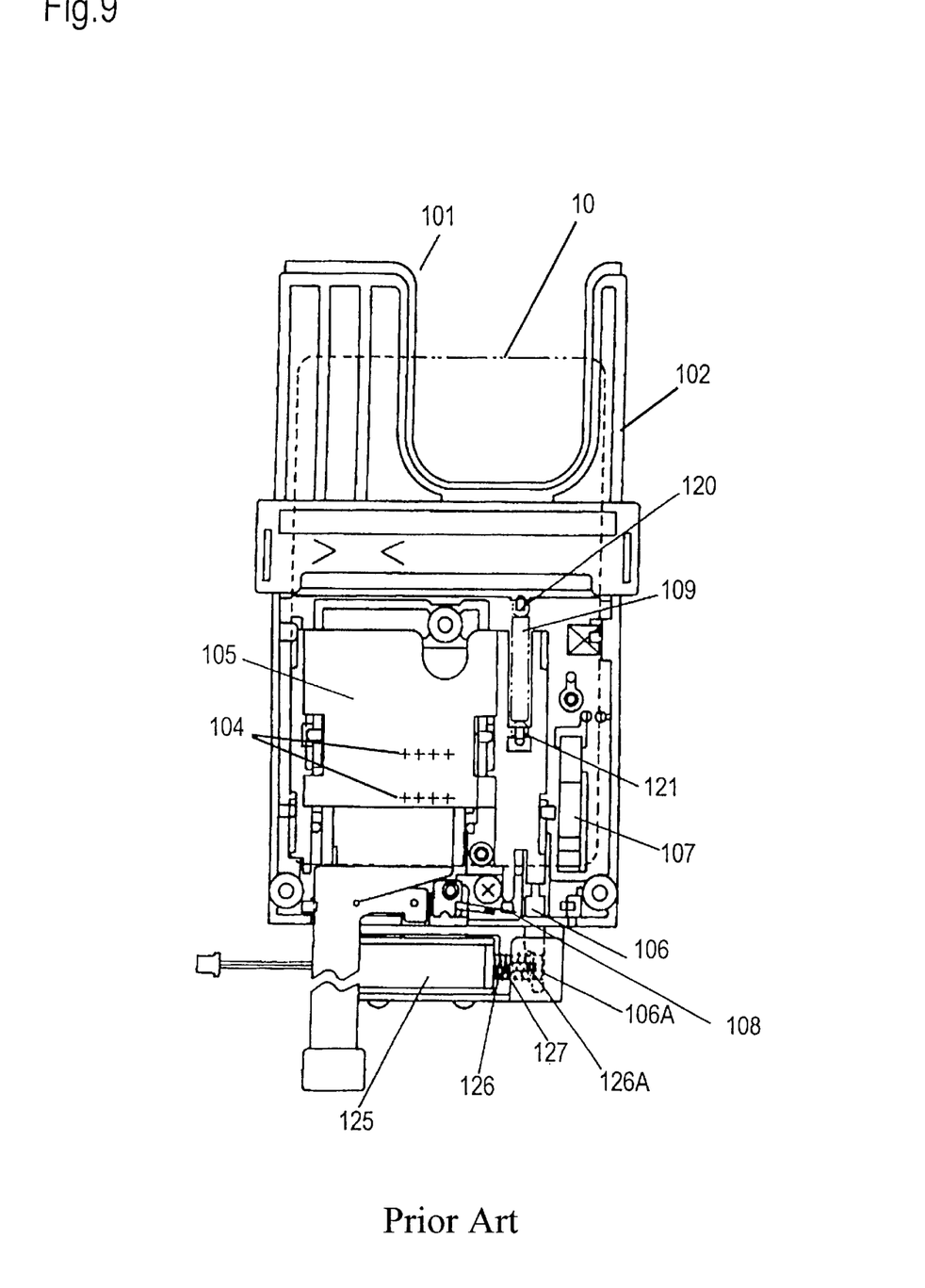
FIG. 9 is a diagram showing a conventional card reader.

A conventional card reader, as shown in FIG. 9, comprises:

a. a card inserting part 101 in which a card 10 is inserted,
b. a slider 105 moving together with the card when the card is inserted,
c. an eject spring 109 energized in an eject direction,
d. a flat spring 107 for pushing in the card thickness direction when the card is inserted,
e. a slider locking part 106A of a slider connection part 106 for stopping and locking the slider 105 at a prescribed position where the slider 105 is inserted,
f. a solenoid 125 for unlocking the latch,
g. a plunger 126 assembled in the solenoid 125,
h. a pin 126A in the plunger 126 for latching with the slider locking part 106A,
i. a spring 127 for energizing the plunger 126 in the latching direction, and
j. a card-detecting switch 108 for detecting when the card is inserted into a prescribed position.

The eject spring 109 is hooked on a first protrusion 120 of the card reader main body 102 and a second protrusion 121 of the slider 105.

As the card is inserted, and when the slider 105 is moved up to a Prescribed position, the slider locking part 106A of the slider connection part 106 is hooked on the pin 126A of the plunger 126. As, a result, the slider 105 is stopped at the prescribed position. The plunger 126 is assembled in the solenoid 125.

The inserted card is ejected when a direct current is passed through the solenoid 125 for a specific time. That is, by passing a direct current into the solenoid 125 for a specific time, the plunger 126 in the solenoid 125 is attracted into the solenoid 125. It causes to unlock the latch of the pin 126A fitted to the slider locking part 106A of the slider 105 and the plunger 126 of the solenoid 125. As a result, by the energizing force of the eject spring 109, the card is ejected into the card inserting part 101 together with the slider 105. At this time, the energizing force of the eject spring 109 is set so as to eject by overcoming the pressure of the flat spring 107 pressing the card 10.

However, for example, when the card reader is used as being incorporated in a small handy type device, the card reader and the device incorporating it can be moved to change in place easily. For instance, the card reader and the device incorporating it can be lifted, rotated, or put on a desk or table carelessly, and impact or vibration is applied to the card reader and the device at that time. In particular, when impact is applied in the moving direction of the plunger 126 of the solenoid 125, a moment in the unlatching direction is generated, and the latch of the slider locking part 106A may be unlocked. If the slider locking part 106A of the slider 105 is unlatched while communicating with a host device such as a host computer by inserting a card, the card is ejected by the eject spring 109 for energizing the slider 105 in the eject direction. In this case, the information cannot be read or written securely. This was a problem of a conventional card reader.

When the card is inserted into the depth side of the card reader, the slider 105 is latched, and the card-detecting switch 108 detects insertion of the card, and the card is in a held state. While a card eject command signal is not issued, the card-detecting switch 108 is in an active state, and the IC contact 104 contacts with the IC terminal on the card, and information is read and written with the host device. At this time, if the card 10 is drawn out, the slider 105 remains latched, and the IC terminal of the card 10 is separated from the IC contact 104 by force. As a result, the information in the IC chip of the card is broken, and may not be usable.

SUMMARY OF THE INVENTION

The invention is to solve the above problems, and it is hence an object thereof to present a card reader and an electronic device in a structure that does not allow the connection part of the slider, which holds the card at a position for reading and writing card data in the card reader, to be unlocked easily by external impact or vibration. The structure also enables a stable ejection of the card.

To achieve the object, the card reader of the invention comprises:

a. a card guide path for guiding a card into the device,
b. a card holder for holding the card at a prescribed position in the device,
c. a card position retainer for retaining the position of the card held by the card holder even if an external force is applied,
d. a motor for generating a power to eject the card, and
e. a gear mechanism for transmitting the driving force of the motor to the card directly or indirectly, in which:
f. the gear mechanism retains the position of the card before driving force from the motor is applied, or
g. the motor generates driving force for ejecting the card by a card eject command signal.

DETAILED DESCRIPTION OF THE EXEMPLARY EMBODIMENTS

Exemplary embodiments of the invention are described below while referring to the accompanying drawings.

Embodiment 1

Figures 1A, 1B:
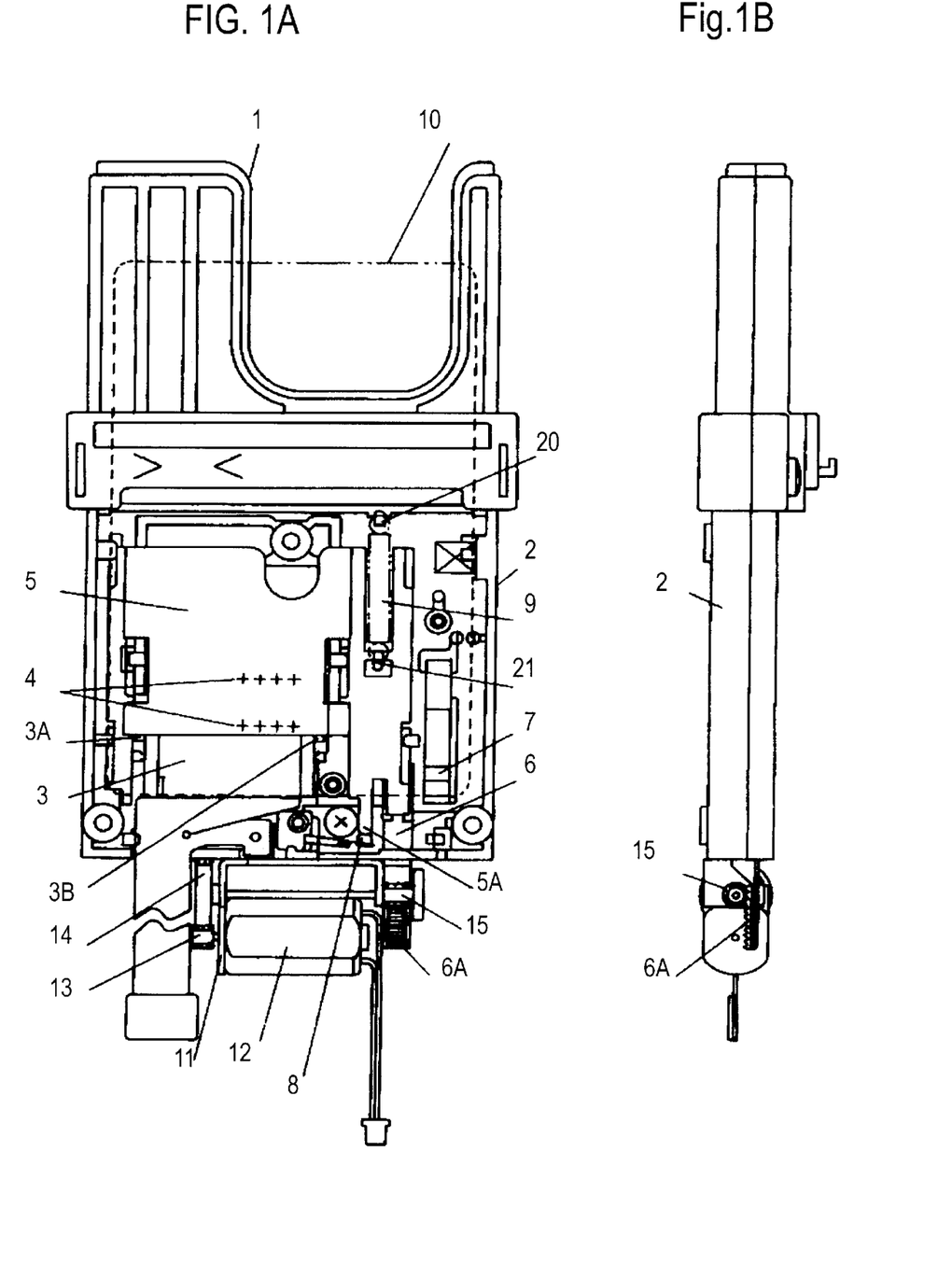
FIG. 1A is a top view showing a constitution of a card reader in embodiment 1 of the invention.
FIG. 1B is a side view of the card reader in FIG. 1A.
Figure 2A:
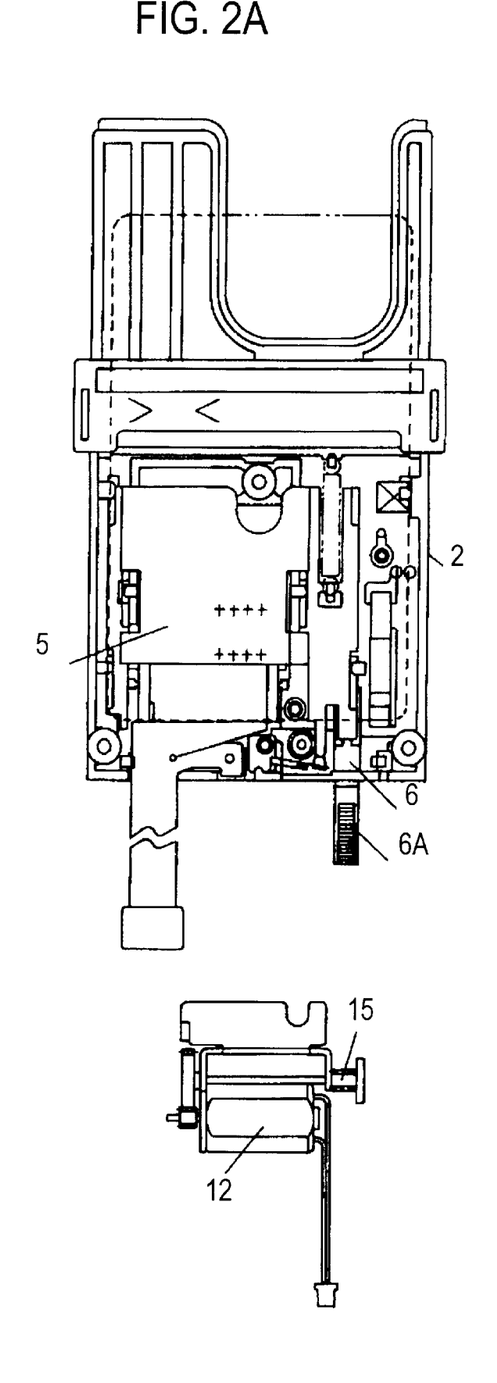
FIG. 2A and FIG. 2B are structural diagrams showing a separate state of the card reader main body and the motor assembly mechanism of the card reader in embodiment 1 of the invention.
Figure 2B:
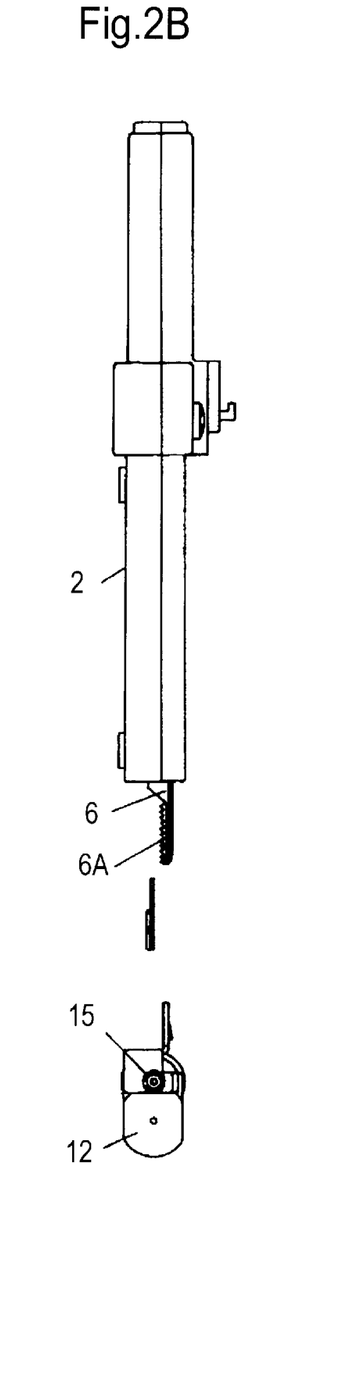

A first embodiment of the invention is described below. In FIG. 1 and FIG. 2, the card reader of embodiment 1 comprises:

a. a card reader main body 2 (hereinafter called main body 2), b. a card inserting part 1 (hereinafter called inserting part 1) for inserting a card into the main body 2, c. an IC contact holder 3 for holding an IC contact 4 to be attached to the card reader, d. an IC contact 4 for exchanging information with the IC attached to the card, e. a slider 5 pushed by the inserted card to move in the depth direction of the main body, f. a flat spring 7 for pushing in the thickness direction of the card when the card is inserted, g. a card-detecting switch 8 for detecting when the card is inserted, h. an eject spring 9 (hereinafter called spring 9) for energizing the card in the direction of the inserting part 1, and i. a motor mechanism 11 and a slider connection part 6 (hereinafter called connection part 6) for ejecting the card.

The motor mechanism 11 is composed of a motor 12, a motor gear 13, a first transmission gear 14, and a second transmission gear The connection part 6 is provided with a gear unit 6A engaged with the transmission gear 15.

Instead of the plunger 126 assembled in the solenoid 125, the pin 126A in the plunger 126 for latching with the slider locking part 106A, and the spring 127 for energizing the plunger 126 in the latching direction in the prior art shown in FIG. 9, the motor mechanism 11 and connection part 6 are provided as the means for ejecting the card in embodiment 1.

In this constitution, a card inserting space (a card guide path) is formed in the main body 2.

In the constitution, the operation is described below.

Figure 3:
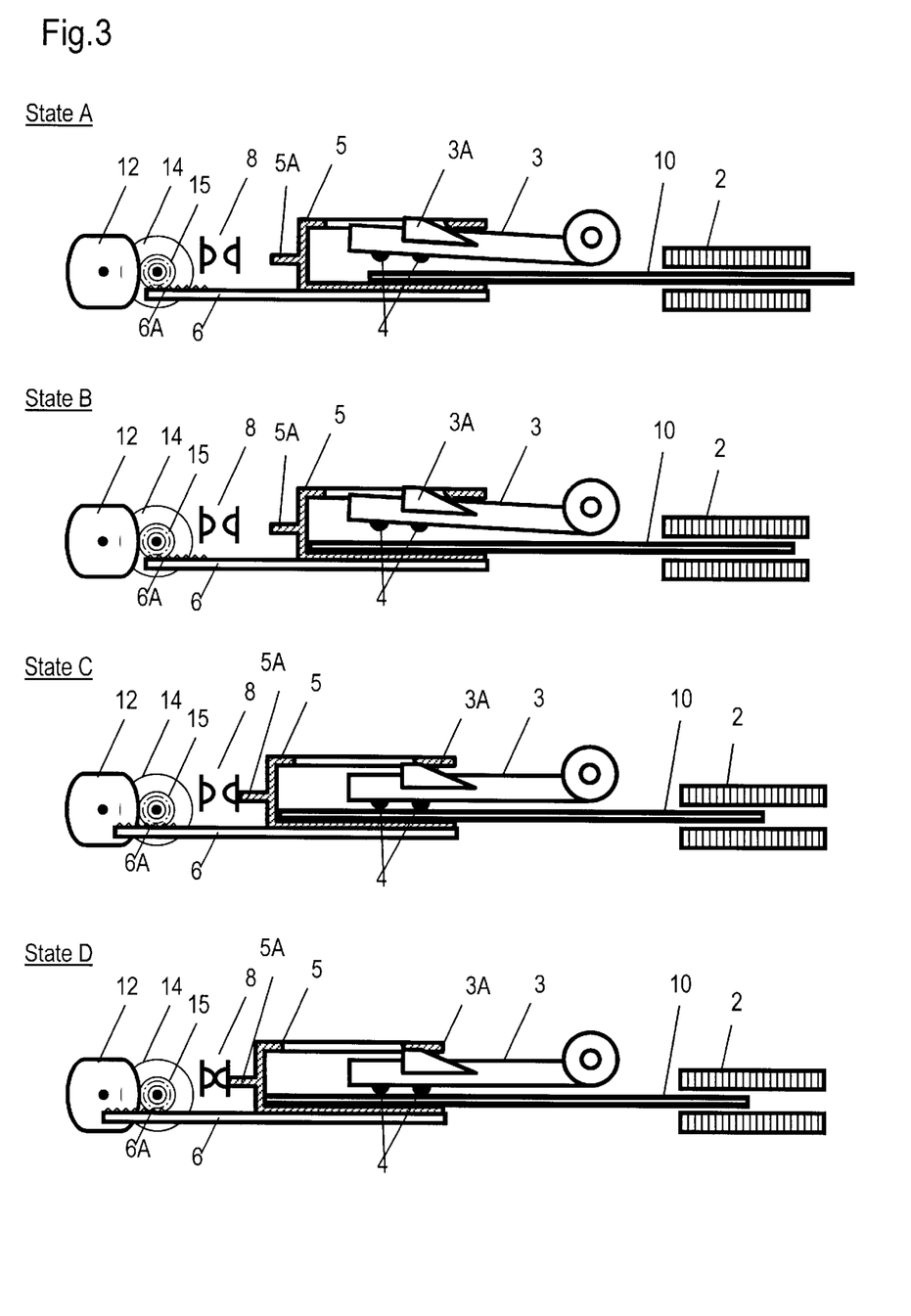
FIG. 3 is a diagram schematically showing the operation state of the slopes of the IC contact holder of the card reader in embodiment 1 of the invention.
Figure 4:
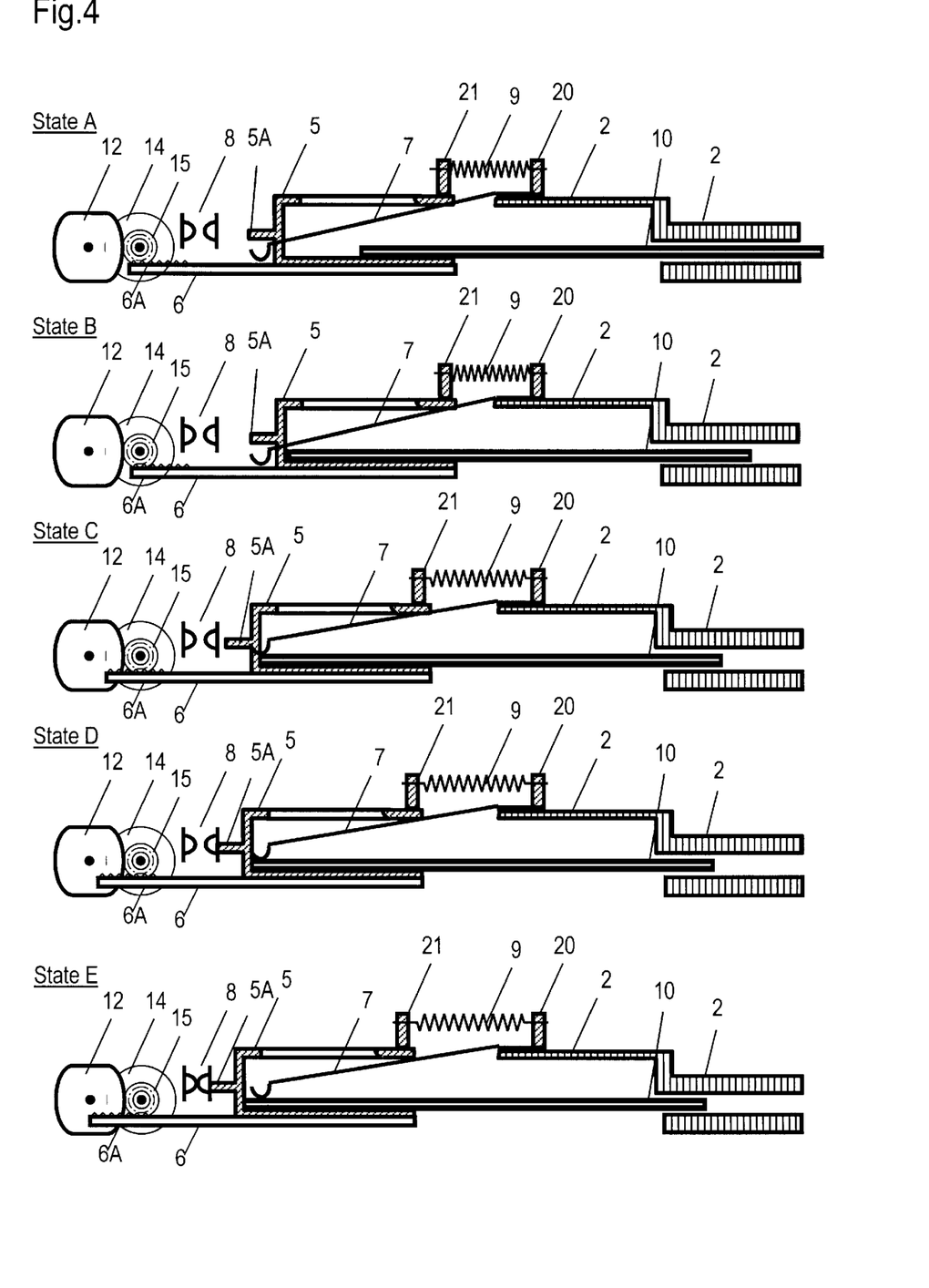
FIG. 4 is a diagram schematically showing the operating state of a flat spring 7 and an eject spring 9 of the card reader in embodiment 1 of the invention.

First, the card inserting action is explained by reference to FIG. 1, FIG. 3, and FIG. 4.

1. A card 10 is inserted from the inserting part 1 of the card reader into the card guide path for guiding into the inside of the main body 2.

2. Further, the card 10 is pushed into the slider 5 energized by the spring 9, and is moved in the depth direction of the main body together with the slider 5 energized by the spring 9. (From state B to state D in FIG. 3; from state B to state E in FIG. 4)

3. Until pushed into a prescribed position, the card 10 pushes up the flat spring 7 of which end is attached to the main body 2 in the thickness direction of the card. (From state B to state C in FIG. 4)

4. Concurrently, as shown in FIG. 3, the slider 5 pushes down slopes 3A, 3B provided in the IC contact holder 3. As a result, the IC contacts 4 in the IC contact holder 3 contacts with an IC terminal on the card 10. (From state B to state D in FIG. 3)

5. Along with the move of the card 10 and the slider 5, the gear unit 6A of the connection part 6 moves in the same direction as the card insertion direction. (From state B to state D in FIG. 3; from state B to state E in FIG. 4)

6. At the same time, the transmission gear 15 for transmitting the power of the motor 12 engaged with the gear unit 6A rotates smoothly.

7. Near the prescribed position, a slider protrusion 5A provided in the slider 5 sets the card-detecting switch 8 in active state. (State D in FIG. 3; state E in FIG. 4)

8. The slider 5, connection part 6 and card 10 cooperate and move to the prescribed position and stop, and the card 10 is held in position by the card pushing pressure of the flat spring 7.

In this state, the card-detecting switch 8 is active, and the IC contact 4 of the IC contact holder 3 contacts securely with the IC terminal on the card 10.

During this card inserting motion, the card 10 is pushing up the flat spring 7 in the thickness direction of the card. The pushing pressure of the flat spring 7 in the card thickness direction is set stronger than the force applied in the eject direction of the spring 9.

In this way, the card 10 is held at the prescribed position, and is locked by the connection part 6 and the second transmission gear 15. In this state, the inserting step is over. In this embodiment, since it is locked by the rotating system of motor 12, motor gear 13, first transmission gear 14 and second transmission gear 15, the latch is not unlocked by an impact in a specific direction as experienced in the prior art. Furthermore, for example, when a rotation preventing spring (not shown) for energizing a spring force is provided on the outer periphery of the first transmission gear 14, unexpected rotation of the gear for transmitting the motor rotation can be prevented. One end of such rotation preventing spring may be preferably fixed on the main body 2.

After the inserting step, the card 10 processes information by reading or writing.

The card eject action after information processing is described bellow.

1) The motor 12 provided in the motor mechanism 11 generates a driving force by a card eject command signal, and rotates in the card ejecting direction.

2) The rotary power of the motor 12 is transmitted to the connection part 6 through the motor gear 13, first transmission gear. 14, and second transmission gear 15. In this process, the rotary power is transformed into a linear power.

3) The linear power stronger than the pushing pressure of the flat spring 7 acts in the direction of ejecting the card 10 moving in cooperation with the slider 5 and connection part 6.

As a result, being released from the card pushing pressure of the flat spring 7, the card is ejected in the direction of the inserting part 1, together with the slider 5, by the energizing force of the spring 9 provided between a first protrusion 20 of the main body 2 and a second protrusion 21 of the slider 5.

Figure 5:
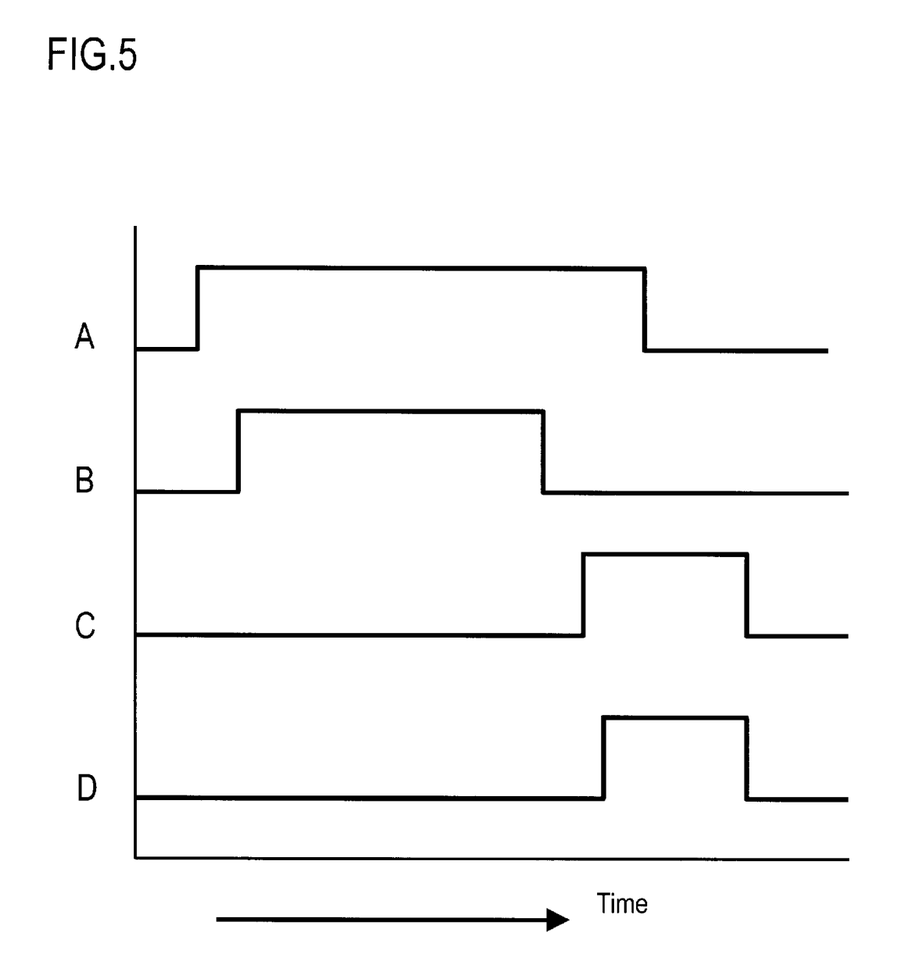
FIG. 5 is a diagram showing operation timing from insertion to ejection of card of the card reader in embodiment 1 of the invention.

FIG. 5 shows this operation in the time sequence. In FIG. 5,

A: active state of the card-detecting switch 8,

B: period of information processing by reading and writing between the card 10 and the host device, C: eject command period, and D: period of eject action of the motor 12.

When the card-detecting switch 8 is in active state, the information is processed between the card 10 and the host device by reading and writing. When reading and writing process is over, an eject command is issued. By the eject command, the motor 12 is put in eject action.

Incidentally, if the card pushing pressure of the flat spring 7 for holding the card 10 is weaker than the spring force of the spring 9 for energizing in the card eject direction, the inserted card 10 is not held at the prescribed position, but is pushed back to the inserting part 1. Accordingly, the card pushing pressure of the flat spring 7 is set stronger than the spring force of the spring 9 for energizing in the card eject direction, so that the card 10 is held at the prescribed position.

As clear from the description so far, in the card reader of embodiment 1, if impact or vibration is applied to the card reader, the engagement of the motor gear and the gear mechanism of the connection part of the slider is not moved. Hitherto, when a moment in unlatching direction occurred in the slider locking part 106A of the slider 105, the slider locking part 106A was sometimes unlatched, but such accident does not occur in the embodiment. Therefore, the card position is retained, and the card reading and writing, can be done securely. The card reader of the embodiment is designed to hold the card by the flat spring before the driving force of the motor is generated. In this constitution, since the slider is stopped and retained in the position with the IC contact holder pressed to the card, the card reading and writing can be done securely.

While the card 10 is inserted in the prescribed position, if the card 10 is manually pulled out from the direction of the card inserting part 1 by force or by mistake, and the slider 5 is moved in the eject direction, the reaction is as follows.

1. When the card 10 is moved in the direction of the card inserting part 1, the slider 5 is also moved in the eject direction by the energizing force of the eject spring 9.

2. The transmission gear unit 6A of the connection part 6 connected with the slider 5 either directly or indirectly moves in the card eject direction.

3. In the motor gear 13, first transmission gear 14, and second transmission gear 15 for transmitting the power of the motor 12, since the gears are free while the motor 12 is not running, the rotary operation in the card eject direction is smooth.

Therefore, the slider 5 moves in the card eject direction without being locked. Further, the slider protrusion 5A is separated from the card-detecting switch 8, and the card-detecting switch 8 is set in inactive state. At this moment, information reading or writing with the host device is suspended.

As a result, the IC contact 4 in the IC contact holder 3 is separated from the IC terminal on the card 10, and the IC reading or writing is suspended normally without destroying the information in the card.

Therefore, in the card reader of the embodiment, when the card is pulled out of the prescribed position, the slider is A simultaneously energized in the reverse direction of the card insertion direction, and the card-detecting switch is set in inactive state, and cancellation of contact between the IC contact and the IC terminal on the card is detected. Thus, card reading or writing can be suspended normally, and destruction of information in card reading and writing can be prevented.

Exemplary Embodiment 2

Embodiment 2 of the invention is described while referring to thee drawings. This is similar to embodiment 1, except that the operating mechanism of the card-detecting switch 8 and the operation of the motor 12 are different.

Figure 6:
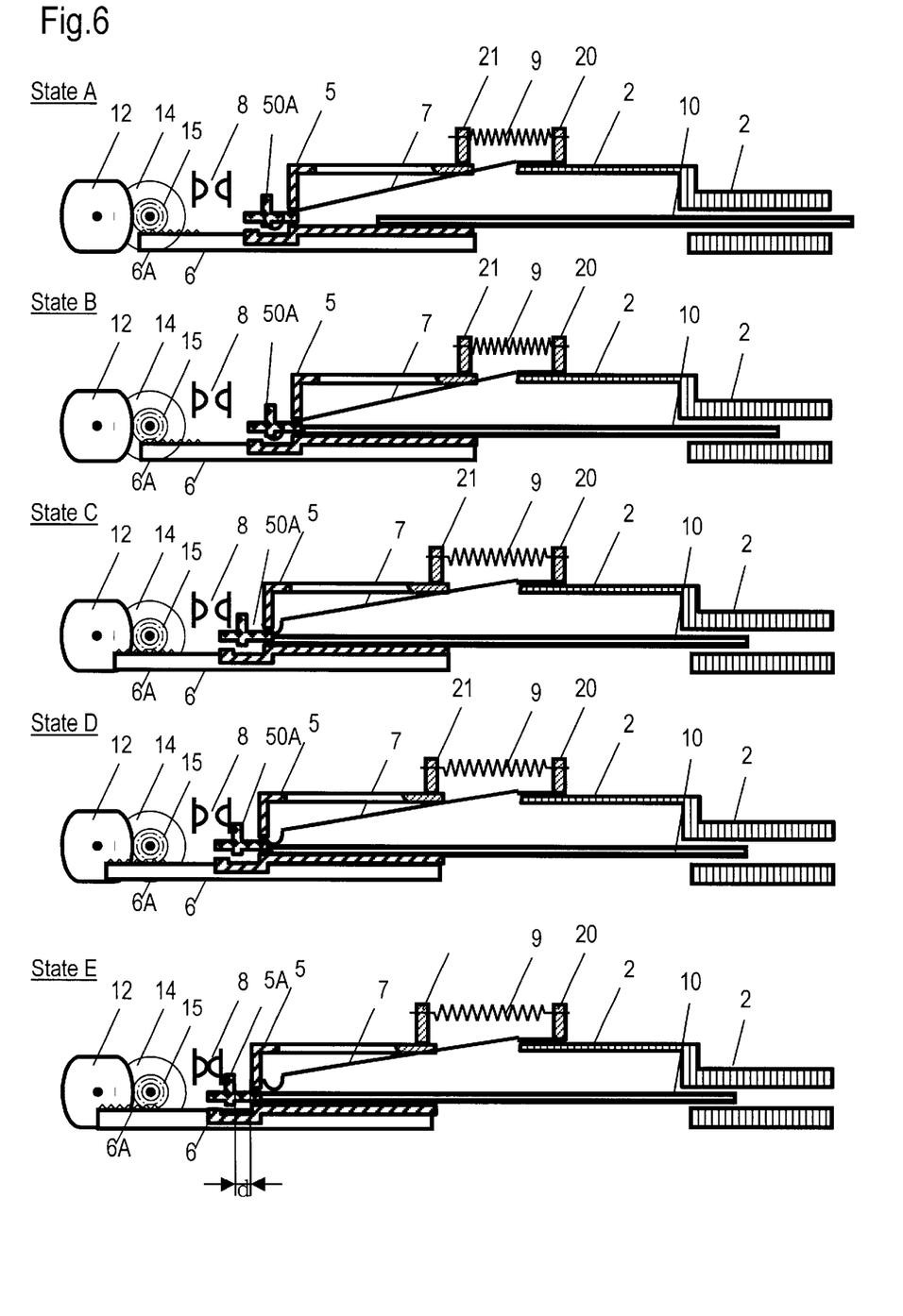
FIG. 6 is a diagram schematically showing the operating state of a flat spring 7 and an eject spring 9 of a card reader in embodiment 2 of the invention.

Referring to FIG. 6, embodiment 2 is explained. A tip part 50A for pushing the card-detecting switch 8 in FIG. 6 is a part independent of the slider 5. That is, the tip part 50A is pushed by the card 10, and this pushing force is applied to the card-detecting switch 8. As a result, the card-detecting switch 8 is set in active state. Herein, gap (d) shown in, state E in FIG. 6 is set so that the card-detecting switch 8 may be set in inactive state when only the card is taken out, for example, from the state in which the card 10 and the slider 5 are pushed in the prescribed position.

Figure 7:
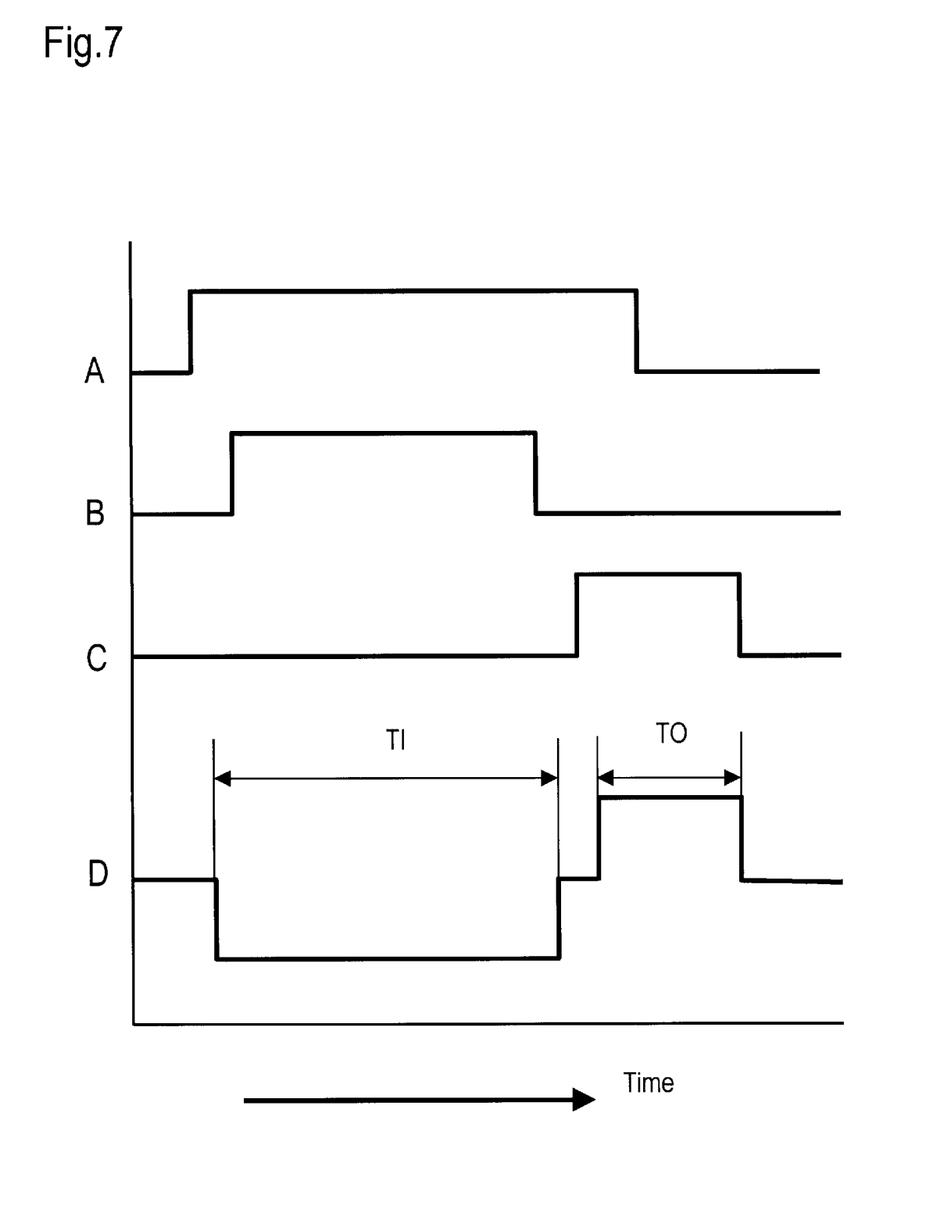
FIG. 7 is a diagram showing operation timing from insertion to ejection of card of the card reader in embodiment 2 of the invention.

FIG. 7 shows the operating state of embodiment 2 in the time sequence. In FIG. 7, A: active state of the card-detecting switch 8, B: period of information processing by reading and writing between the card 10 and the host device, C: eject command period, D-T1: period of rotation of the motor 12 in insertion direction, and D-T0: period of eject operation of the motor 12.

When the card is inserted and the card-detecting switch 8 is in active state, the motor 12 drives in the card insertion direction. Parallel to this operation, information is processed by reading and writing between the card 10 and the host device. When finishing the reading and writing process, an eject command is issued. When the eject command is issued, driving of the motor 12 in the insertion direction is stopped. Next, the motor 12 rotates in the eject direction, and drives the card 10 and the slider in the eject direction.

Herein, the driving force of the motor 12 in the insertion direction is generated, but the card 10 and the slider 5 no longer move further from the prescribed position. Therefore, if vibration or impact is applied during information processing by reading or writing between the card 10 and the host device, the prescribed position is retained stably.

While the card 10 is inserted in the prescribed position, if the card 10 is manually pulled out from the direction of the card inserting part 1 by force or by mistake, and the slider 5 is moved in the eject direction, the reaction is as follows.

1. When the card 10 is moved in the direction of the card inserting part 1, the slider 5 is fixed as the driving force in the insertion direction of the motor 12 is transmitted to the gear mechanism. Therefore, only the card 10 is moved.

2. When the card 10 moves in the eject direction, the tip part 50A loses its force of pressing the card-detecting switch 8.

3. When the force of pressing the card-detecting switch 8 is lost, the card-detecting switch is set in inactive state by its releasing force.

4. At this moment, therefore, reading or writing of information with the host device is suspended.

As a result, the IC contact 4 in the IC contact holder 3 is separated from the IC terminal on the card 10, and the IC reading or writing is suspended normally without destroying the information in the card.

Therefore, in embodiment 2 of the invention, being resistant to vibration or impact, if the card is pulled out unexpectedly, IC reading or writing can be suspended normally without destroying the information in the card.

Exemplary Embodiment 3

Figure 8:
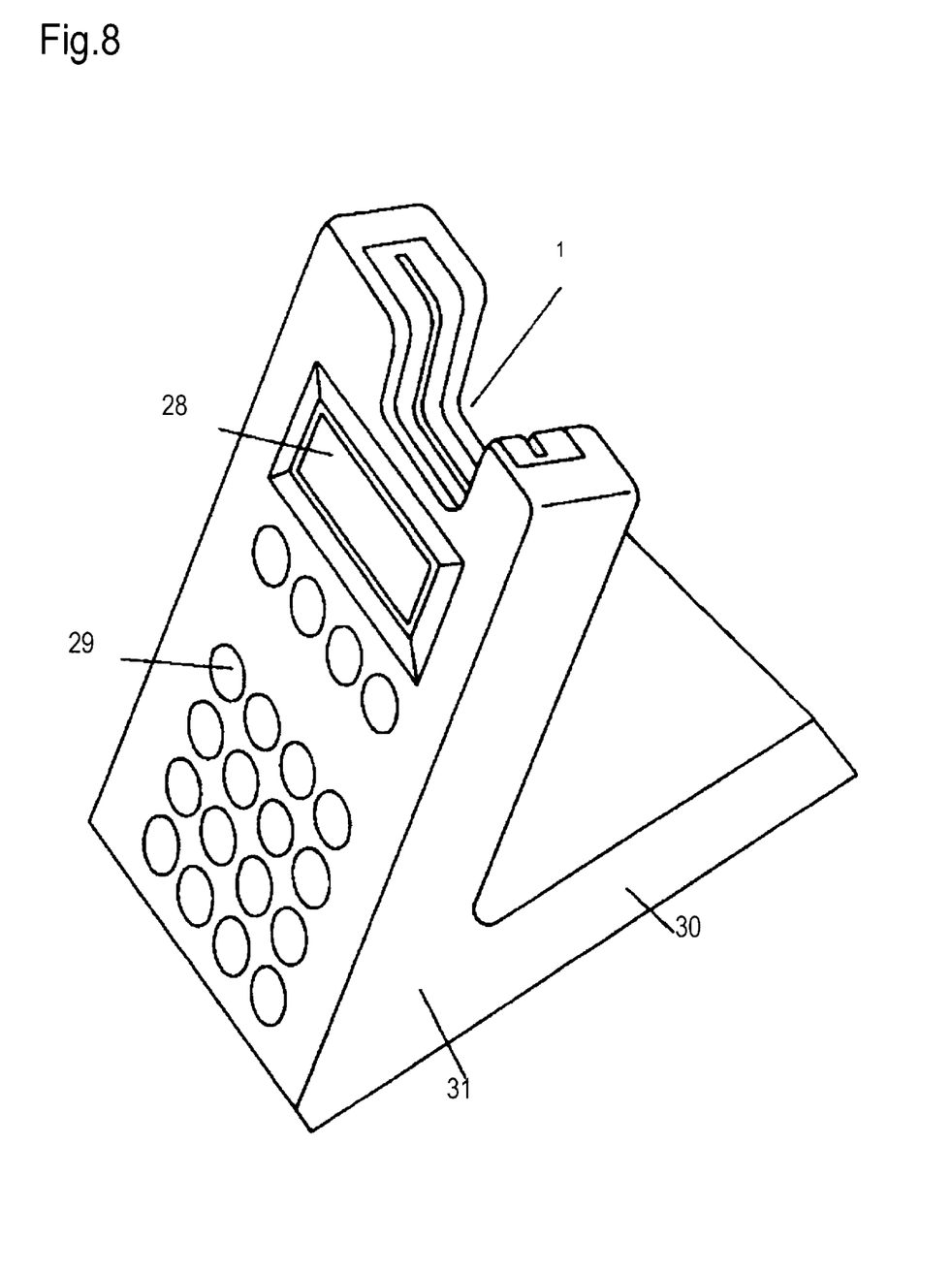
FIG. 8 is a diagram showing the appearance of an electronic device in which the card reader of the invention is incorporated.

FIG. 8 shows a perspective outline view of an electronic device incorporating a card reader of the invention. The card reader main body is provided in a casing 31, and the card is inserted from a card slot 1. The electronic device has numeric keys 29, so that password and other numerical data can be entered. It also comprises a display 28 for showing the communication state between the card reader and the host device, information processing state, user's password and others. Reference numeral 30 is a stand for mounting the electronic device.

In the electronic device incorporating the card reader of the invention in this constitution, since the card eject mechanism of the card reader is provided so as to operate by using the motor and the transmission gear, if impact or vibration is applied, the motor gear and the transmission gear remain engaged with each other, and do not move in the eject direction. Therefore, the contact of the IC contact and the IC terminal on the card is not disengaged. Hence, the electronic device incorporating the card reader of the invention can prevent interruption of reading or writing of the card and destruction of information.

What is claimed is:

1. A card reader, for use with an electronic device and a card having an IC contact, said card reader comprising:
   a contact;
   a card guide path for guiding the card into the device;
   a slider for sliding on said card guide path so as to transfer the card to a predetermined position in the device under power from manual insertion of the card, said predetermined position being a position where said contact makes contact with the IC contact of the card;
   card holding means for holding the card at said predetermined position;
   a transmission gear disposed at an edge of said slider; and
   a motor directly or indirectly coupled to said transmission gear, said motor remaining inactive during insertion of the card and tending to maintain a position of said slider while said motor is inactive during and after insertion via coupling between said motor and said transmission gear, and, in response to an eject command, said motor being operable to transmit power to said transmission gear to slide said slider in a direction that is reverse to the card insertion direction.

2. A card reader according to claim 1, further comprising:
   a main body;
   wherein said card holding means comprises a flat spring, attached to said main body, biased to contact the card and apply a pushing pressure on the card in a thickness direction of the card.

3. A card reader according to claim 2, further comprising:
   an eject spring connected to said slider and having an energizing force tending to move said slider in the direction that is reverse to the card insertion direction, wherein the pushing pressure of said flat spring is greater than the energizing force of said eject spring such that said flat spring is operable to hold said slider.

4. A card reader according to claim 3, wherein said motor is operable, in response to the eject command, to transmit power to said transmission gear to slide said slider in the direction that is reverse to the card insertion direction to move the card along said card guide path to a location where said flat spring does not contact the card so as to remove the pushing pressure of said flat spring from said card, and said eject spring is operable, in absence of the pushing pressure of said flat spring on the card, to eject the card by moving said slider in the direction that is reverse to the card insertion direction.

5. A card reader according to claim 2, wherein said slider is operable, due to the card being manually inserted in the card insertion direction, to move said contact to the position where said contact makes contact with the IC contact of the card.

6. A card reader according to claim 5, wherein said slider is operable, due to the card being moved in the direction opposite to the card insertion direction, to move said contact away from the position where said contact makes contact with the IC contact of the card so as to disengage said contact from the IC contact of the card.

7. A card reader according to claim 6, further comprising:
   an eject spring connected to said slider and having an energizing force tending to move said slider in the direction that is reverse to the card insertion direction.

8. An electronic device for use with a card having an IC contact, said electronic device comprising:
   an information input key operable to receive input information including a password;
   a display operable to display further information including the information input via said information input key;
   a casing including said information input key and said display; and
   a card reader including
      a contact,
      a card guide path for guiding the card into said electronic device,
      a slider for sliding on said card guide path so as to transfer the card to a predetermined position in the device under power from manual insertion of the card, said predetermined position being a position where said contact makes contact with the IC contact of the card;
      card holding means for holding the card at said predetermined position,
      a transmission gear disposed at an edge of said slider, and
      a motor directly or indirectly coupled to said transmission gear, said motor remaining inactive during insertion of the card and tending to maintain a position of said slider while said motor is inactive during and after insertion via coupling between said motor and said transmission gear, and, in response to an eject command, said motor being operable to transmit power to said transmission gear to slide said slider in a direction that is reverse to the card insertion direction.

9. An electronic device according to claim 8, wherein:
   said card reader further comprises a main body; and
   said card holding means comprises a flat spring, attached to said main body, biased to contact the card and apply a pushing pressure on the card in a thickness direction of the card.

10. An electronic device according to claim 9, wherein said card reader further comprises:
    an eject spring connected to said slider and having an energizing force tending to move said slider in the direction that is reverse to the card insertion direction, wherein the pushing pressure of said flat spring is greater than the energizing force of said eject spring such that said flat spring is operable to hold said slider.

11. An electronic device according to claim 10, wherein said motor is operable, in response to the eject command, to transmit power to said transmission gear to slide said slider in the direction that is reverse to the card insertion direction to move the card along said card guide path to a location where said flat spring does not contact the card so as to remove the pushing pressure of said flat spring from said card, and said eject spring is operable, in absence of the pushing pressure of said flat spring on the card, to eject the card by moving said slider in the direction that is reverse to the card insertion direction.

12. An electronic device according to claim 9, wherein said slider is operable, due to the card being manually inserted in the card insertion direction, to move said contact to the position where said contact makes contact with the IC contact of the card.

13. An electronic device according to claim 12, wherein said slider is operable, due to the card being moved in the direction opposite to the card insertion direction, to move said contact away from the position where said contact makes contact with the IC contact of the card so as to disengage said contact from the IC contact of the card.

14. An electronic device according to claim 13, further comprising:
    an eject spring connected to said slider and having an energizing force tending to move said slider in the direction that is reverse to the card insertion direction.

* * * * *